United States Patent
Tozawa

(10) Patent No.: US 9,851,958 B2
(45) Date of Patent: Dec. 26, 2017

(54) METHOD, APPARATUS, AND COMPUTER PROGRAM FOR SPECIALIZING SERIALIZER

(71) Applicant: International Business Machines Corporation, Armonk, NY (US)

(72) Inventor: Akihiko Tozawa, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 258 days.

(21) Appl. No.: 14/571,483

(22) Filed: Dec. 16, 2014

(65) Prior Publication Data

US 2015/0186116 A1    Jul. 2, 2015

(30) Foreign Application Priority Data

Dec. 26, 2013 (JP) .................................. 2013-269077

(51) Int. Cl.
G06F 17/30 (2006.01)
G06F 9/45 (2006.01)
G06F 9/44 (2006.01)

(52) U.S. Cl.
CPC ............ *G06F 8/437* (2013.01); *G06F 9/4435* (2013.01); *G06F 17/30439* (2013.01)

(58) Field of Classification Search
CPC ................................................ G06F 17/30439
See application file for complete search history.

(56) References Cited

U.S. PATENT DOCUMENTS

| 4,430,699 | A | * | 2/1984 | Segarra | ............ | G06F 15/17337 |
| | | | | | | 370/452 |
| 7,197,512 | B2 | | 3/2007 | Pharies et al. | | |
| 9,015,679 | B2 | | 4/2015 | Boening et al. | | |
| 9,262,312 | B1 | * | 2/2016 | Gazit | ....................... | G06F 12/00 |
| 9,306,851 | B1 | * | 4/2016 | Gazit | ..................... | H04L 45/748 |
| 2004/0244012 | A1 | * | 12/2004 | Massarenti | ........... | G06F 9/4435 |
| | | | | | | 719/319 |

(Continued)

FOREIGN PATENT DOCUMENTS

| JP | 2003122730 A | 4/2003 |
| JP | 2003122773 A | 4/2003 |

(Continued)

OTHER PUBLICATIONS

Florescu et al., The BEA/XQRL Streaming XQuery Processor, 2003, 12 pages.*

(Continued)

*Primary Examiner* — Noosha Arjomandi
(74) *Attorney, Agent, or Firm* — Daniel R. Simek

(57) ABSTRACT

To provide a method, apparatus, and computer program for performing type inference of serialization for each generation site and specializing a serializer for each generation site. A type of serialization is inferred for each generation site of compiling a query, and a serializer is specialized for each generation site based on the inferred type and a type that is actually used. A data value is serialized using the specialized serializer for each generation site. The inference is executed while transcribing identification information assigned to each generation site to a type as an annotation, and the inferred type and the type used in serialization are recursively compared.

12 Claims, 8 Drawing Sheets

(56) References Cited

U.S. PATENT DOCUMENTS

| | | | |
|---|---|---|---|
| 2005/0097110 A1* | 5/2005 | Nishanov | G06F 17/30569 |
| 2005/0262313 A1* | 11/2005 | Holt | G06F 9/44563 |
| | | | 711/150 |
| 2008/0123500 A1* | 5/2008 | Yu | G11B 7/1267 |
| | | | 369/59.11 |
| 2009/0172035 A1* | 7/2009 | Lessing | G06F 17/30595 |
| 2009/0319498 A1* | 12/2009 | Zabokritski | G06F 17/30427 |
| 2009/0327225 A1* | 12/2009 | Parra | G06F 17/30424 |
| 2010/0100707 A1* | 4/2010 | Mejdrich | H04L 45/58 |
| | | | 712/205 |
| 2010/0169888 A1* | 7/2010 | Hare | G06Q 10/107 |
| | | | 718/102 |
| 2011/0078516 A1* | 3/2011 | El-Kersh | G06F 9/466 |
| | | | 714/48 |
| 2011/0083014 A1* | 4/2011 | Lim | H04L 29/12764 |
| | | | 713/168 |
| 2011/0145489 A1* | 6/2011 | Yu | G06F 3/0613 |
| | | | 711/103 |
| 2011/0179219 A1* | 7/2011 | Ma | G06F 3/0613 |
| | | | 711/103 |
| 2011/0184969 A1* | 7/2011 | Idicula | G06F 17/30938 |
| | | | 707/760 |
| 2012/0084315 A1* | 4/2012 | Schneider | G06F 17/30442 |
| | | | 707/769 |
| 2013/0117326 A1* | 5/2013 | De Smet | G06F 9/4428 |
| | | | 707/798 |
| 2014/0108462 A1* | 4/2014 | Pfeifle | G06F 17/30318 |
| | | | 707/795 |
| 2014/0258063 A1* | 9/2014 | Chourasia | G06Q 40/12 |
| | | | 705/35 |
| 2014/0280293 A1* | 9/2014 | Scanlon | G06F 17/3048 |
| | | | 707/769 |

FOREIGN PATENT DOCUMENTS

| | | |
|---|---|---|
| JP | 2003249961 A | 9/2003 |
| JP | 2005056085 A | 3/2005 |
| JP | 2005157718 A | 6/2005 |
| JP | 2005209048 A | 8/2005 |
| JP | 2007519078 A | 7/2007 |
| JP | 2007522558 A | 8/2007 |
| JP | 2010237867 A | 10/2010 |
| WO | 2011111532 A1 | 9/2011 |

OTHER PUBLICATIONS

Benzaken et al., "Static and Dynamic Semantics of NoSQL Languages", 2013, pp. 1-24, POPL 13, 40th ACM Symposium on Principles of Programming Languages, ACM Press.

Tozawa, Japan Patent Application 2013269077 (English Translation), "Method, Apparatus, and Computer Program for Specializing Serializer", filed Dec. 26, 2013.

Serge Abiteboul, Data on the Web: From Relations to semistructured Data and XML, Japan, Kyoritsu Shuppan Co., Ltd., vol. 1, pp. 123-162, Jul. 15, 2006. Publication Date Jul. 15, 2006.

Bill Wagner, More Effective C#, Japan, Shoeisha Co., Ltd., vol. 1, pp. 24-28, Nov. 30, 2009., Publication Date: Nov. 30, 2009.

Elsman, Martin, "Type Specialized Serialization with Sharing", Technical Report ITUTR43, IT University of Copenhagen, Feb. 24, 2004, 9 pages.

* cited by examiner $[\,t^*\,] \vdash \text{keyValue } t$ $\dfrac{t \vdash \text{keyValue } [t1,\ t2]}{t \vdash \text{value } t2}$ ⋯ (PREDICATE)

$\dfrac{s \vdash \text{value } s'}{s\,|\,t \vdash \text{value } s'}$

FIG. 3

$$\frac{C \vdash \{R\} <: t}{C, \{\ell \ R\} <: t \vdash \{\ell \ R\} <: t}$$

$$\frac{C \vdash s <: t \quad C \vdash \{R\} <: \{R'\}}{C \vdash \{c : s, \ R\} <: \{c : t, .R'\}}$$

$$\frac{C \vdash s <: t \quad C \vdash \{R\} <: \{R'\}}{C \vdash \{c : s, \ R\} <: \{c? : t, .R'\}}$$

$$\frac{R \text{ does not contain } c: \ldots \quad C \vdash \{R\} <: \{.R'\}}{C \vdash \{R\} <: \{c? : t, .R'\}}$$

$$C \vdash \{\} <: \{\}$$

⋯ (RULE 1)

FIG. 4

$$\frac{C \vdash [A] <: t}{C[^\ell \ A] <: t \ \vdash [^\ell \ A] <: t}$$

$$\frac{C \vdash s <: t}{C, \vdash [s*] <: [t*]}$$ ... (RULE 2)

FIG. 5

$$\frac{C \vdash s <: u \quad C' \vdash t <: u}{C, C' \vdash s \mid t <: u}$$ ... (RULE 3)

FIG. 6

$$\frac{\vdash long <: t}{long^\ell <: t \vdash long^\ell <: t}$$

$$\frac{\vdash string <: t}{string^\ell <: t \vdash string^\ell <: t}$$ ... (RULE 4)

FIG. 7

$$\frac{C \vdash s <: t}{C \vdash s <: t\,|\,u}$$

$$\frac{C \vdash s <: u}{C \vdash s <: t\,|\,u}$$

⋯ (RULE 5)

FIG. 8

METHOD, APPARATUS, AND COMPUTER PROGRAM FOR SPECIALIZING SERIALIZER

CROSS-REFERENCE TO RELATED APPLICATION

This application claims the benefit of priority under 35 U.S.C. 119 from Application No. 2013-269077, filed on Dec. 26, 2013 in Japan, the contents of which are incorporated by reference herein.

BACKGROUND OF THE INVENTION

The present invention relates to a method, apparatus, and computer program for performing type inference of serialization for each generation site and specializing a serializer for each generation site.

With the recent proliferation of Internet environments, improvements in processing speed of various computers has led to an increase in attention to big data, which is a massive volume of digital data. Big data is not merely massive in volume, but also unstructured and requires high real-time performance. In conventional database management systems, data is structured and stored, and later processed and analyzed. It is therefore regarded as difficult to handle big data whose properties are incompatible with conventional databases.

In the case of analyzing data using a NoSQL (Structured Query Language) language, (e.g., JAQL), for handling semi-structured data, such as JavaScript Object Notation (JSON), a proper response may not be obtained due to a bottleneck caused by the input and output costs of a large amount of data communication. Accordingly, various measures can be taken, such as unifying data processing using a type (schema) and also compressing data to reduce the data size before analysis.

For example, patent literatures including Japanese Patent Application Publication Numbers 2003-122730, 2003-122773, 2003-249961, 2005-056085, 2005-157718, and 2005-209048, Japanese Translation of PCT International Application Publication No. 2007-522558, and WO 2011/111532 disclose techniques of executing serialization and/or deserialization in the case of processing a massive volume of digital data. Mostly, serialization and/or deserialization disclosed in the patent literatures 1 to 8 are dynamically executed while checking types and values.

Japanese Translation of PCT International Application Publication No. 2007-519078 and Japanese Patent Application Publication No. 2010-237867 disclose systems that use type inference for inferring a type (schema). For example, by inferring a type of a record having values and names (identifiers), big data can be deserialized to data that can be actually handled.

SUMMARY

However, in the case where serialization and/or deserialization are dynamically executed while checking types and values, there is a problem of possible excessive processing loads. For example, in the case of compiling a query, a type generalized by merging of control flows in the query is inferred. The use of an existing serializer here involves an immense amount of time and cost to check types and values.

The present invention has been made in view of such circumstances, and has an object of providing a method, apparatus, and computer program for performing type inference of serialization for each generation site and specializing a serializer for each generation site.

To achieve the object stated above, a method according to a first aspect of the invention is a method executable in an apparatus for generating at least one of a serializer and a deserializer in the case of compiling a query, the method including: inferring a type of serialization for each generation site of compiling the query; specializing the serializer for each generation site, based on the inferred type and a type that is actually used; and serializing a data value using the specialized serializer for each generation site.

A method according to a second aspect of the invention is the method according to the first aspect, wherein inferring a type of serialization for each generation includes: executing the inference, while transcribing identification information assigned to each generation site to a type as an annotation; and recursively comparing the inferred type and the type used in serialization.

A method according to a third aspect of the invention is the method according to inferring a type of serialization for each generation or specializing the serializer for each generation site, wherein in the case of generating a serializer of a record type having an optional area, specializing the serializer for each generation site includes: generating code for outputting a bit "1," in the case of determining that an optional area in a first type T0 is already requested in a second type Tc; generating code for outputting a bit "0," in the case of determining that the optional area in the first type T0 is not present in the second type Tc; and generating, in the case where the optional area in the first type T0 is also an optional area in the second type Tc, code for outputting a bit "1" if a data value is present and code for outputting a bit "0" if no data value is present.

A method according to a fourth aspect of the invention is the method according to inferring a type of serialization for each generation or specializing the serializer for each generation site, wherein in the case of generating a serializer of a selection type in which a first type is selected from a plurality of types from T0 to Tn where n is a natural number, specializing the serializer for each generation site includes: generating code for outputting a numeric value "i," in the case of determining that a second type Tc is a subtype of only the selected first type Ti where i is any of 1 to n; and generating code for serializing a data value, based on the second type Tc and the selected first type Ti.

To achieve the object stated above, an apparatus according to a fifth aspect of the invention is an apparatus for generating at least one of a serializer and a deserializer in the case of compiling a query, the apparatus including: type inference means for inferring a type of serialization for each generation site of compiling the query; specialization means for specializing the serializer for each generation site, based on the inferred type and a type that is actually used; and means for serializing a data value using the specialized serializer for each generation site.

An apparatus according to a sixth aspect of the invention is the apparatus according to the fifth aspect, wherein the type inference means includes: means for executing the inference, while transcribing identification information assigned to each generation site to a type as an annotation; and means for recursively comparing the inferred type and the type used in serialization.

An apparatus according to a seventh aspect of the invention is the apparatus according to the fifth or sixth aspect, wherein in the case of generating a serializer of a record type having an optional area, the specialization means includes: means for generating code for outputting a bit "1," in the case of determining that an optional area in a first type T0 is already requested in a second type Tc; means for generating code for outputting a bit "0," in the case of determining that the optional area in the first type T0 is not present in the second type Tc; and means for generating, in the case where the optional area in the first type T0 is also an optional area in the second type Tc, code for outputting a bit "1" if a data value is present and code for outputting a bit "0" if no data value is present.

An apparatus according to an eighth aspect of the invention is the apparatus according to the fifth or sixth aspect, wherein in the case of generating a serializer of a selection type in which a first type is selected from a plurality of types from T0 to Tn where n is a natural number, the specialization means includes: means for generating code for outputting a numeric value "i," in the case of determining that a second type Tc is a subtype of only the selected first type Ti where i is any of 1 to n; and means for generating code for serializing a data value, based on the second type Tc and the selected first type Ti.

To achieve the object stated above, a computer program according to a ninth aspect of the invention is a computer program executable in an apparatus for generating at least one of a serializer and a deserializer in the case of compiling a query, the computer program causing the apparatus to function as: type inference means for inferring a type of serialization for each generation site of compiling the query; specialization means for specializing the serializer for each generation site, based on the inferred type and a type that is actually used; and means for serializing a data value using the specialized serializer for each generation site.

A computer program according to a tenth aspect of the invention is the computer program according to the ninth aspect, causing the type inference means to function as: means for executing the inference, while transcribing identification information assigned to each generation site to a type as an annotation; and means for recursively comparing the inferred type and the type used in serialization.

A computer program according to an eleventh aspect of the invention is the computer program according to the ninth or tenth aspect, causing, in the case of generating a serializer of a record type having an optional area, the specialization means to function as: means for generating code for outputting a bit "1," in the case of determining that an optional area in a first type T0 is already requested in a second type Tc; means for generating code for outputting a bit "0," in the case of determining that the optional area in the first type T0 is not present in the second type Tc; and means for generating, in the case where the optional area in the first type T0 is also an optional area in the second type Tc, code for outputting a bit "1" if a data value is present and code for outputting a bit "0" if no data value is present.

A computer program according to a twelfth aspect of the invention is the computer program according to the ninth or tenth aspect, causing, in the case of generating a serializer of a selection type in which a first type is selected from a plurality of types from T0 to Tn where n is a natural number, the specialization means to function as: means for generating code for outputting a numeric value "i," in the case of determining that a second type Tc is a subtype of only the selected first type Ti where i is any of 1 to n; and means for generating code for serializing a data value, based on the second type Tc and the selected first type Ti.

According to the present invention, a dedicated serializer and/or deserializer can be generated for each generation site. Thus, a type used in serialization for each generation site can be reliably inferred, instead of dynamically inferring a type of a serializer which is an object, which can reduce the overall processing time.

BRIEF DESCRIPTION OF THE DRAWINGS

FIG. 3 is a diagram showing an example of a predicate for computing a type where only a data value part is extracted in the generation apparatus according to the embodiment of the present invention.

FIG. 4 is a diagram showing an example of a rule in the case of a record type in the generation apparatus according to the embodiment of the present invention.

FIG. 5 is a diagram showing an example of a rule in the case of an array type in the generation apparatus according to the embodiment of the present invention.

FIG. 6 is a diagram showing an example of a rule in the case of a union type in the generation apparatus according to the embodiment of the present invention.

FIG. 7 is a diagram showing an example of a rule in the case of a primitive type in the generation apparatus according to the embodiment of the present invention.

FIG. 8 is a diagram showing an example of a rule in the case where a union type appears on the right side in the generation apparatus according to the embodiment of the present invention.

DETAILED DESCRIPTION

An apparatus (generation apparatus) for generating at least one of a serializer and a deserializer in the case of compiling a query according to an embodiment of the present invention is described in detail below, with reference to drawings. Note that the invention defined in the Claims is not limited by the following embodiment, and not all combinations of the characteristic matters described in the embodiment are essential to solve the problems.

Moreover, the present invention can be implemented in many different modes, and should not be construed as being limited to the description of the embodiment. The same elements are given the same reference signs throughout the embodiment. The present invention may be a system, a method, and/or a computer program product. The computer program product may include a computer readable storage medium (or media) having computer readable program instructions thereon for causing a processor to carry out aspects of the present invention.

Though the following embodiment describes an apparatus realized by introducing a computer program into a computer system, it is obvious to those skilled in the art that part of the present invention can be implemented as a computer program executable in a computer. That is, the present invention can be embodied as hardware which is an apparatus (generation apparatus) for generating at least one of a serializer and a deserializer in the case of compiling a query, as software, or as a combination of hardware and software. The computer program can be stored in any computer-readable recording medium such as a hard disk, a DVD, a CD, an optical storage device, or a magnetic storage device.

According to the embodiment of the present invention, a dedicated serializer and/or deserializer can be generated for each generation site. Thus, a type used in serialization for each generation site can be reliably inferred statically during query compilation, instead of dynamically checking a value of an object and determining a type used in serialization during data processing, which can reduce the overall processing time.

Figure 1:
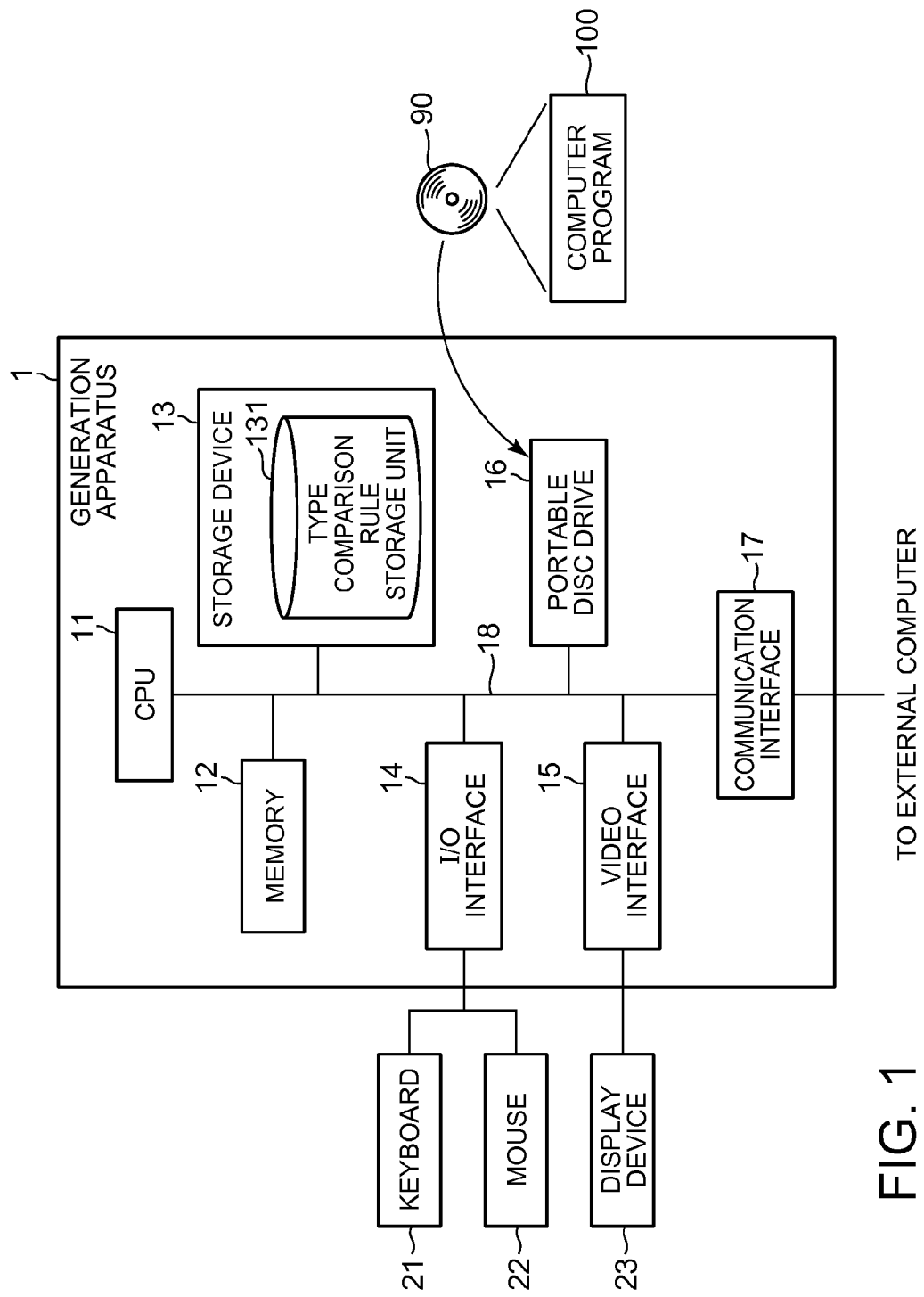
FIG. 1 is a block diagram schematically showing a structure of a generation apparatus according to an embodiment of the present invention.

FIG. 1 is a block diagram schematically showing a structure of a generation apparatus according to an embodiment of the present invention. A generation apparatus 1 according to the embodiment of the present invention includes at least a CPU (Central Processing Unit) 11, a memory 12, a storage device 13, an I/O interface 14, a video interface 15, a portable disc drive 16, a communication interface 17, and an internal bus 18 for connecting the foregoing hardware.

The CPU 11 is connected to the above-mentioned hardware elements of the generation apparatus 1 via the internal bus 18. The CPU 11 controls the operations of the above-mentioned hardware elements, and also executes various software functions according to a computer program 100 stored in the storage device 13. The memory 12 is composed of a volatile memory such as a static random-access memory (SRAM) or a synchronous dynamic random access memory SDRAM. A load module is expanded in the memory 12 when the computer program 100 is executed, to store temporary data generated during the execution of the computer program 100 and the like.

The storage device 13 is composed of a built-in fixed storage device (hard disk), a ROM, or the like. The computer program 100 stored in the storage device 13 is downloaded from a portable recording medium 90 such as a DVD or a CD-ROM in which information such as programs and data is stored, using the portable disc drive 16. Upon execution, the computer program 100 is deployed from the storage device 13 to the memory 12 and executed. The computer program may be downloaded from an external computer connected via the communication interface 17.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The storage device 13 includes a type comparison rule storage unit 131 storing a rule for type comparison. A rule for recursively comparing an inferred type and a type used in serialization for each generation site is stored in the type comparison rule storage unit 131.

For example, a rule for computing a predicate is stored according to type such as a record type, a union type, and a primitive type. The CPU 11 computes the predicate according to the stored rule, and compares the inferred type and the type actually used in serialization.

The communication interface 17 is connected to the internal bus 18, and is capable of data transmission and reception to and from the external computer and the like when connected to an external network such as the Internet, a LAN, or a WAN.

The I/O interface 14 is connected to input devices such as a keyboard 21 and a mouse 22, and receives data input. The video interface 15 is connected to a display device 23 such as a CRT display or a liquid crystal display, and displays a given image.

Figure 2:
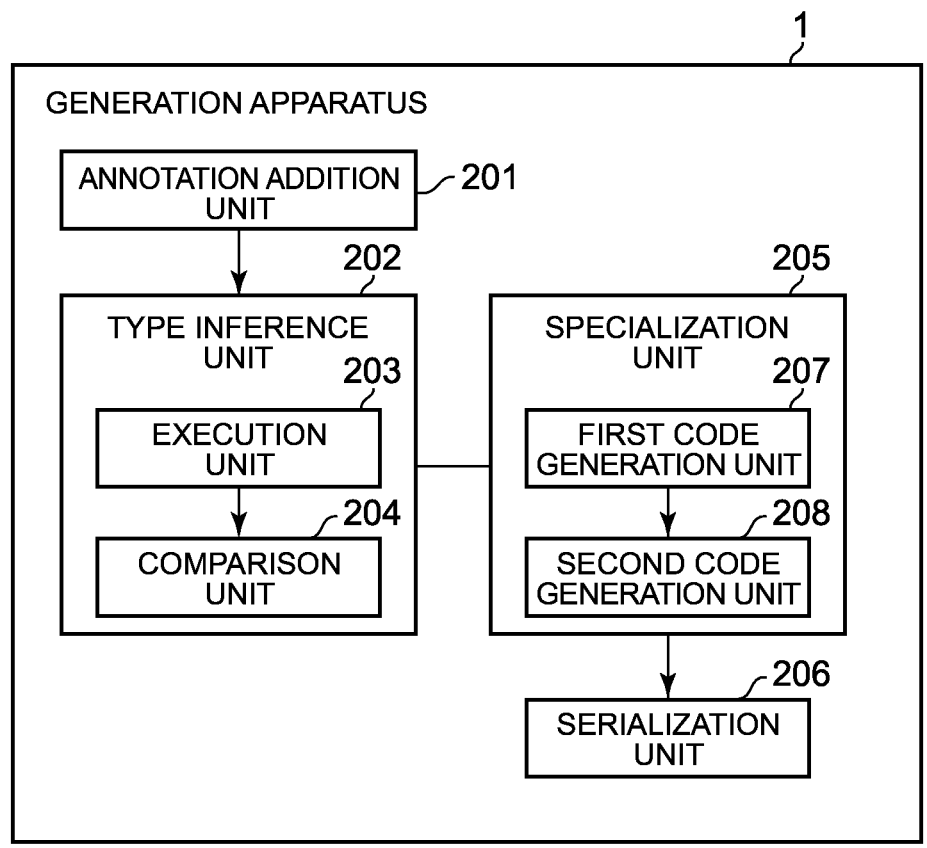
FIG. 2 is a functional block diagram of the generation apparatus according to the embodiment of the present invention.

FIG. 2 is a functional block diagram of the generation apparatus 1 according to the embodiment of the present invention. In FIG. 2, an annotation addition unit 201 in the generation apparatus 1 adds an annotation for identifying a generation site, to a sub-expression of a query.

For example, suppose queries to two tables, $t0 and $t1, are respectively represented by map functions shown in Expression 1.

$$\mathrm{map}Fn0(\$t0) = \$t0 \rightarrow \mathrm{transform}\ \$x[\$x.id, \{"x":\$x\}]$$

$$\mathrm{map}Fn1(\$t1) = \$t1 \rightarrow \mathrm{transform}\ \$y[\$y.id, \{"y":\$y\}]. \quad \text{(Expression 1)}$$

An annotation is assigned to each generation site to identify that the generation site is added to the right side (sub-expression) of Expression 1. As an example, adding an annotation for the table $t0 yields Expression 2.

$$\$t0^2 \rightarrow \mathrm{transform}1\$x[^3\$x^5,^4id^6,\{^7"x"^8:\$x^9\}]. \quad \text{(Expression 2)}$$

A type inference unit 202 (e.g., a type inference means) infers a type of serialization for each generation site of compiling a query.

In practice, the type inference unit 202 includes: an execution unit 203 for executing inference, while transcribing identification information assigned to each generation site, to a type as an annotation; and a comparison unit 204 for recursively comparing an inferred type and a type used in serialization.

The execution unit 203 (e.g., means for executing the inference) transcribes identification information assigned to each generation site to a type as an annotation to thereby obtain Expression 3, in the case of executing type inference. Expression 3 is a type-inferred annotated type Tc.

$$Tc=l^1[^3long^0,\{^7"x":\{^0"id":long^0,"name":string^0\}\}^*]. \quad \text{(Expression 3)}$$

In more detail, the rule of type inference varies according to a sub-expression. For example, in the case where a sub-expression of a NoSQL expression is a "transform" expression as in Expression 2, the type of the left side is recursively inferred. When the inference result is a variable length array type [t*], an assumption that the type of the variable $x is t is added to an environment Γ, and the type of $[^3\$x^5, {}^4id^6,\{^7"x"^8:\$x^9\}]$, which is a sub-expression, is inferred.

When the type inference result of the sub-expression is a type u, an array type [l u*] is inferred. This is written as Expression 4. In Expression 4, e denotes the left side of Expression 2, e2 denotes the expression in square brackets "[ ]" in Expression 2, l (the lowercase of letter L) denotes the numeric value of the annotation, and u denotes the result of type-inferring the sub-expression e2.

$$\frac{\Gamma - e:[t*] \quad \Gamma, \$x:t \vdash e2:u}{\Gamma \vdash e \to \text{transform}/ \$x[l\ u*]} \quad \text{(Expression 4)}$$

In the case where the sub-expression of the NoSQL expression is an if-expression, such as "if e then e1 else e2," the types of the sub-expressions e, e1, and e2 are recursively inferred. When the type inference results are respectively Bool, s, and t, a union type s|t is inferred, yielding Expression 5.

$$\frac{\Gamma \vdash e:\text{Bool} \quad \Gamma \vdash e1:s \quad \Gamma \vdash e2:t}{\Gamma \vdash \text{if } e \text{ then } e1 \text{ else } e2:\ s\ |\ t} \quad \text{(Expression 5)}$$

In the case where the sub-expression of the NoSQL expression is a generation expression of a constant length array [le1, e2, . . . ], the types of the sub-expressions e1, e2, . . . are recursively inferred. When the type inference results are respectively t1, t2, . . . , a constant length array type [lt1, t2, . . . ] is inferred for [le1, e2, . . . ], yielding Expression 6.

$$\frac{\Gamma \vdash e1:t1 \quad \Gamma - e2:t2\ ...}{\Gamma - [l\ e1, e2,\ ...\ ]:[l\ t1, t2,\ ...\ ]} \quad \text{(Expression 6)}$$

In the case where the sub-expression of the NoSQL expression is a generation expression of a record type $\{^1c1:e1,\ c2:e2,\ ...\ \}$, the types of the sub-expressions e1, e2, . . . are recursively inferred. When the inference results are respectively t1, t2, . . . , a record type $\{^1c1:t1,\ c2:t2,\ ...\ \}$ is inferred for $\{^1c1:e1,\ c2:e2,\ ...\ \}$, yielding Expression 7.

$$\frac{\Gamma - e1:t1 \quad \Gamma \vdash e2:t2\ ...}{\Gamma - \{l\ c1:e1,\ c2:e2,\ ...\ \}:\{l\ c1:t1, c2:t2,\ ...\ \}} \quad \text{(Expression 7)}$$

In the case where the sub-expression of the NoSQL expression is the variable $x, a type t is inferred for the variable $x when $x:t is present in the environment, yielding Expression 8.

$$\Gamma,\$x:t \vdash \$x:t \quad \text{(Expression 8)}$$

The annotated type Tc can be inferred by combining the above-mentioned type inferences.

The comparison unit 204 (e.g., means for recursively comparing) recursively compares the inferred type Tc (second type) and a type T0 (first type) used in serialization. The type T0 used in serialization is, for example, a type of a value of a map output as shown in Expression 9. The comparison unit 204 recursively compares the type T0 used in serialization and the annotated type Tc inferred in Expression 3.

$$To=\{"x"?:\{"id":long,"name":string\},"y"?:\{"id": long,"score":double\}\} \quad \text{(Expression 9)}$$

In detail, a predicate is computed according to the rule, which is stored in the type comparison rule storage unit 131 in the storage device 13, for recursively comparing the type used in serialization for each generation site. The type for serialization is then specified for each generation site.

In this embodiment, the inferred type Tc includes both a data value and key information using an array. Accordingly, a predicate for computing a type Tc' where only the data value part is extracted is defined first. FIG. 3 is a diagram showing an example of the predicate for computing the type Tc' where only the data value part is extracted in the generation apparatus 1, according to the embodiment of the present invention. The generation apparatus 1 defines the predicate according to the rule, as shown in FIG. 3.

In the case where the predicate shown in FIG. 3 is applied to the type Tc shown in Expression 3, as an example, the type Tc' can be obtained in curly brackets in Expression 10.

$$Tc\text{-value}\{^7"x":\{^0"id":long^0,"name:string^0\}\} \quad \text{(Expression 10)}$$

Next, the obtained type Tc' and the type T0 are recursively compared. Here, a predicate is equally computed based on the rule stored in the type comparison rule storage unit 131. FIG. 4 is a diagram showing an example of a rule in the case of a record type in the generation apparatus 1, according to the embodiment of the present invention. In the case where the type is a record type, the generation apparatus 1 computes the predicate according to Rule 1 shown in FIG. 4.

In the case where the type is other than a record type, too, the predicate can be computed according to the rule stored in the type comparison rule storage unit 131 in the storage device 13. FIG. 5 is a diagram showing an example of a rule in the case of an array type in the generation apparatus 1, according to the embodiment of the present invention. In the case where the type is an array type, the generation apparatus 1 computes the predicate according to Rule 2 shown in FIG. 5.

Likewise, the rule differs according to type. FIG. 6 is a diagram showing an example of a rule (Rule 3) in the case of a union type in the generation apparatus 1, according to the embodiment of the present invention. FIG. 7 is a diagram showing an example of a rule (Rule 4) in the case of a primitive type in the generation apparatus 1, according to the embodiment of the present invention. FIG. 8 is a diagram showing an example of a rule (Rule 5) in the case where a union type appears on the right side in the generation apparatus 1, according to the embodiment of the present invention. The generation apparatus 1 selects one of Rule 1 through Rule 5 according to type, and computes the predicate.

Applying such rule to Expression 3 enables the predicate to be computed as shown in Expression 11.

$$\{^7"x":\{^0"id":long0,"name::string0\}\}$$

$$<:\{"x"?:\{"id":long,"name":string\},"y"?:"id":long, "score":double\}\}$$

$\{^0\text{"id"}:\text{long}^0,\text{"name"}:\text{string}^0\} <: \{\text{"id"}:\text{long},\text{"name"}:\text{string}\}$ $\text{long}^0 <: \text{long}$ $\text{string0} <: \text{string}$ ⊢$Tc' <: To$                                  (Expression 11)

As can be seen from the computation result of Expression 11, a record (e.g., a data value) generated in the record generation expression $\{^7\text{"x"}^8:\$x^9\}$ is serialized by a type $\{\text{"x"}?:\{\text{"id"}:\text{long},\text{"name"}:\text{string}\}, \text{"y"}?:\{\text{"id"}:\text{long},\text{"score"}:\text{double}\}\}$, and a record included in the input $t0 in Expression 1 is serialized by a type $\{\text{"id"}:\text{long},\text{"name"}:\text{string}\}$.

Referring back to FIG. 2, a specialization unit 205 (e.g., a specialization means) specializes a serializer based on the type computed for each generation site. A serialization unit 206 (e.g., a means for serializing data) generates code for serializing a record (e.g., data value) using the specialized serializer, for each generation site.

The specialization unit 205 includes a first code generation unit 207 and a second code generation unit 208 (e.g., means for generating code), according to type. The first code generation unit 207 is selected and executed in the case of generating a serializer of a record type having an optional area. The second code generation unit 208 is selected and executed in the case of generating a serializer of a selection type selected from a plurality of types from T0 to Tn (where n is a natural number).

In the case of generating a serializer of a record type having an optional area, the generation of code for serialization of a bit vector is started. The first code generation unit 207 generates code for outputting a bit "1," in the case of determining that an optional area in the first type T0 is already requested in the second type Tc.

The first code generation unit 207 generates code for outputting a bit "0," in the case of determining that the optional area in the first type T0 is not present in the second type Tc. In the case where the optional area in the first type T0 is also an optional area in the second type Tc, the first code generation unit 207 outputs a bit "1" if a data value is present, and outputs a bit "0" if no data value is present. The first code generation unit 207 then generates code for serialization to serialize the whole area following the bit code.

The second code generation unit 208 generates code for outputting a numeric value "i," in the case of determining that the second type Tc is a subtype of only the selected first type Ti (i is any of 1 to n). The second code generation unit 208 generates code for serializing a data value, based on the second type Tc and the selected first type Ti. The second code generation unit 208 equally generates code for serialization to serialize the whole area following the bit code.

In the case where the first type T0 is any other type, code for serialization is generated in an existing method. Code for serialization is equally generated to serialize the whole area following the bit code.

Figure 9:
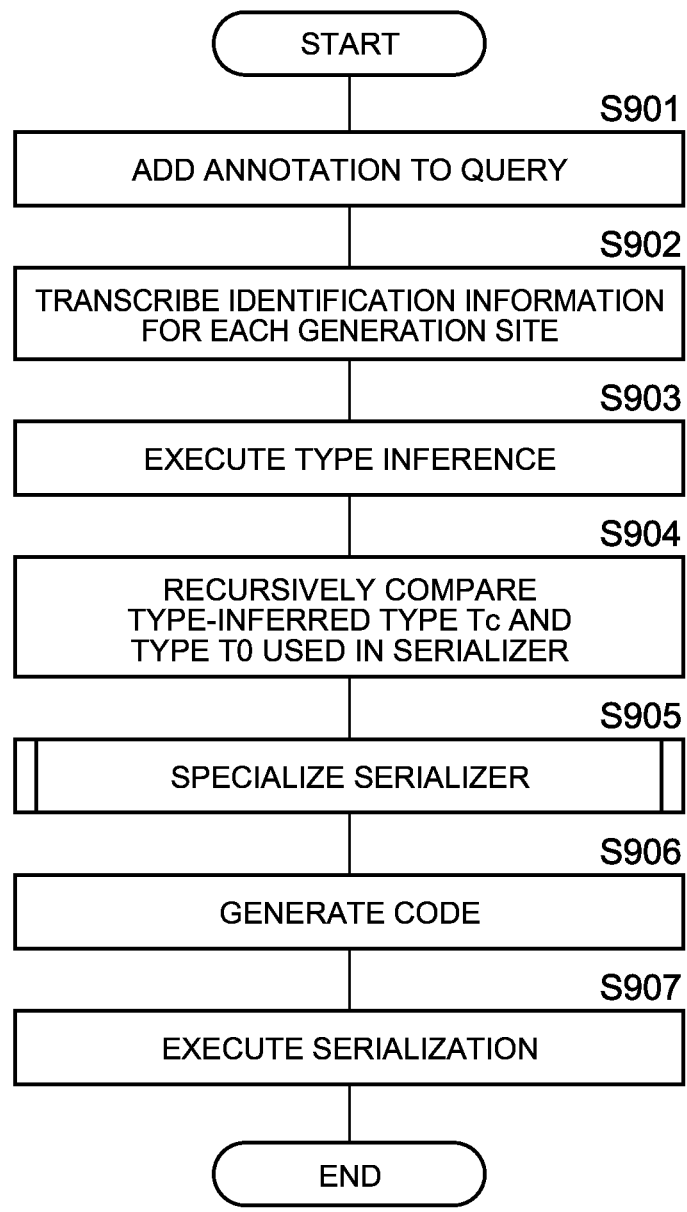
FIG. 9 is a flowchart showing a procedure of a CPU in the generation apparatus according to the embodiment of the present invention.

FIG. 9 is a flowchart showing a procedure of the CPU 11 in the generation apparatus 1 according to the embodiment of the present invention. In FIG. 9, the CPU 11 in the generation apparatus 1 adds an annotation for identifying a generation site, to a sub-expression of a query (step S901).

The CPU 11 transcribes identification information assigned to each generation site of query compilation to a type as an annotation (step S902), and executes type inference (step S903). The CPU 11 recursively compares the inferred annotated type (second type) Tc and the type (first type) T0 used in serialization (step S904).

The CPU 11 specializes a serializer based on the compared type for each generation site (step S905), and generates code for serializing a record (e.g., a data value) using the specialized serializer for each generation site (step S906). The CPU 11 then equally generates code for serialization to serialize the whole area following the bit code (step S907).

Figure 10:
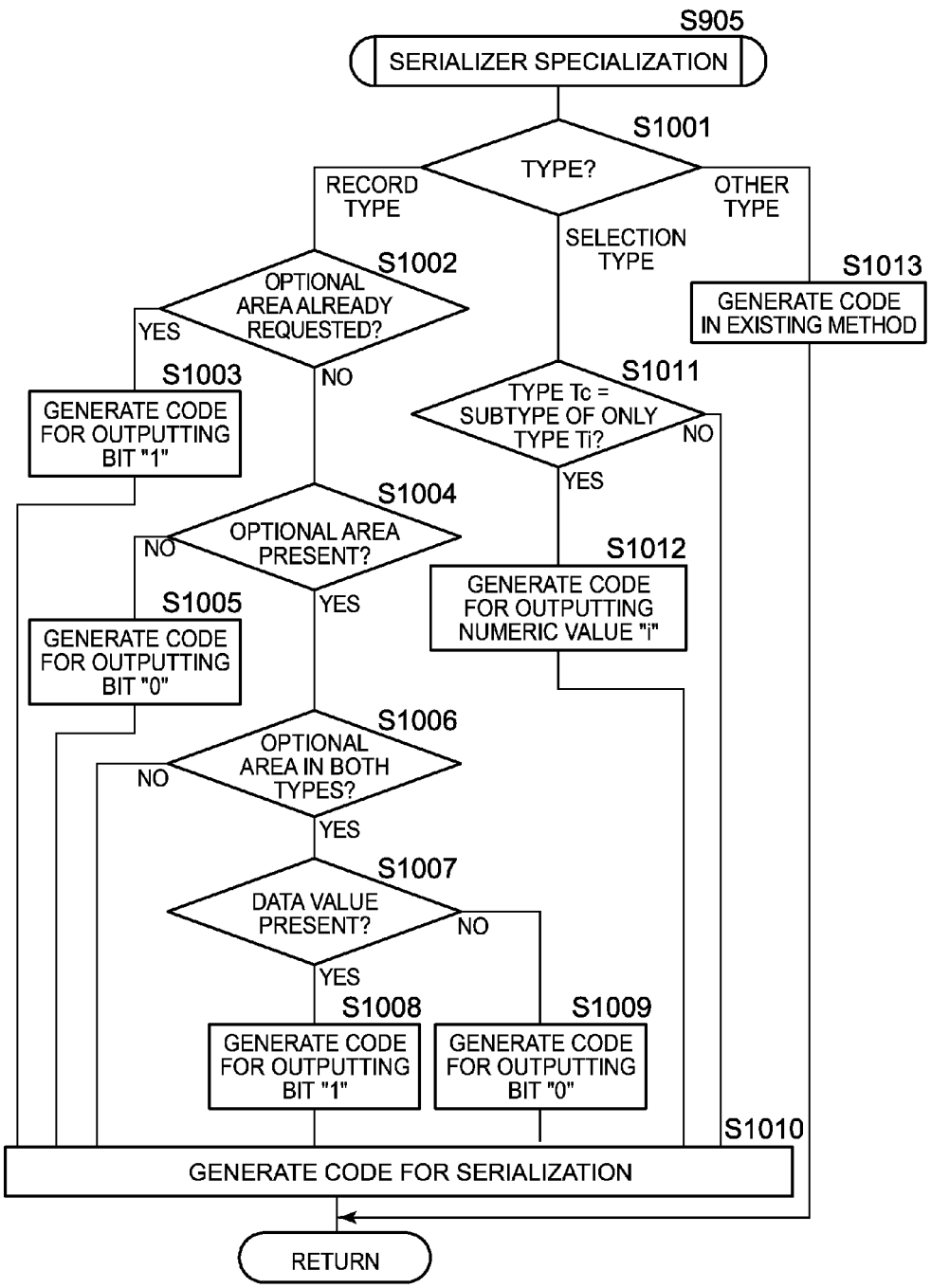
FIG. 10 is a flowchart showing a serializer specialization procedure of the CPU in the generation apparatus according to the embodiment of the present invention.

FIG. 10 is a flowchart showing a serializer specialization procedure of the CPU 11 in the generation apparatus 1 according to the embodiment of the present invention. In FIG. 10, the CPU 11 in the generation apparatus 1 determines a type for generating a serializer (step S1001).

In the case where the CPU 11 determines that the type is a record type having an optional area (step S1001: record type), the CPU 11 determines whether or not an optional area in the first type T0 is already requested in the second type Tc (step S1002). In the case where the CPU 11 determines that the optional area is already requested (step S1002: YES), the CPU 11 generates code for outputting a bit "1" (step S1003).

In the case where the CPU 11 determines that the optional area is not already requested (step S1002: NO), the CPU 11 determines whether or not the optional area in the first type T0 is present in the second type Tc (step S1004). In the case where the CPU 11 determines that the optional area is not present (step S1004: NO), the CPU 11 generates code for outputting a bit "0" (step S1005).

In the case where the CPU 11 determines that the optional area is present (step S1004: YES), the CPU 11 determines whether or not the optional area in the first type T0 is also an optional area in the second type Tc (step S1006). In the case where the CPU 11 determines that the optional area in the first type T0 is not the optional area in the second type Tc (step S1006: NO), the CPU 11 skips steps S1007 to S1009. In the case where the CPU 11 determines that the optional area in the first type T0 is also the optional area in the second type Tc (step S1006: YES), the CPU 11 determines whether or not a data value is present in the optional area (step S1007).

In the case where the CPU 11 determines that the data value is present (step S1007: YES), the CPU 11 generates code for outputting a bit "1" (step S1008). In the case where the CPU 11 determines that no data value is present (step S1007: NO), the CPU 11 generates code for outputting a bit "0" (step S1009). The CPU 11 equally generates code for serialization to serialize the whole area following the bit code (step S1010).

In the case where the CPU 11 determines that the type for generating the serializer is a selection type selected from a plurality of types from the first type T0 to Tn (where n is a natural number) (step S1001: selection type), the CPU 11 determines whether or not the type Tc is a subtype of only the type Ti (step S1011). In the case where the CPU 11 determines that the type Tc is not the subtype (step S1011: NO), the CPU 11 skips step S1012. In the case where the CPU 11 determines that the type Tc is the subtype (step S1011: YES), the CPU 11 generates code for outputting the numeric value "i" (where i is any of 1 to n) (step S1012). The CPU 11 generates code for serializing a data value, based on the second type Tc and the selected first type Ti (step S1010).

In the case where the CPU 11 determines that the type for generating the serializer is any other type (step S1001: other type), the CPU 11 generates code for serialization in an existing method (step S1013).

As described above, according to this embodiment, a dedicated serializer and/or deserializer can be generated for each generation site. Thus, a type used in serialization for each generation site can be reliably inferred statically during query compilation, instead of dynamically checking a value of an object and determining a type used in serialization during data processing, which reduces the overall processing time.

Note that the present invention is not limited to the embodiment described above, as various changes and modifications are possible within the scope of the present invention. Though the above embodiment describes serialization as an example, the processing load can also be reduced by deserialization using a type specified for each generation site.

What is claimed is:

1. A method for generating at least one of a serializer and a deserializer for compiling a query, the method comprising:
    inferring, by one or more processors, a type of serialization for each generation site of compiling a query;
    executing, by one or more processors, the inferred type of serialization, while transcribing identification information assigned to each generation site to a type as an annotation;
    specializing, by one or more processors, a serializer for each generation site based on the inferred type of serialization and a type of serialization that is actually used at a generation site;
    recursively, by one or more processors, comparing the inferred type of serialization and the type of serialization that is actually used at a generation site; and
    serializing, by one or more processors, a data value using the specialized serializer for each generation site.

2. The method according to claim 1, wherein in a case of generating a serializer of a record type having an optional area, specializing a serializer for each generation site comprises:
    in response to determining that an optional area in a first type is already requested in a second type, generating, by one or more processors, code for outputting a first bit;
    in response to determining that the optional area in the first type is not present in the second type, generating, by one or more processors, code for outputting a second bit; and
    in response to determining that the optional area in the first type is also an optional area in the second type, generating, by one or more processors, code for outputting a first bit if a data value is present, and generating, by one or more processors, code for outputting a second bit if no data value is present.

3. The method according to claim 1, wherein in a case of generating a serializer of a record type having an optional area, specializing a serializer for each generation site comprises:
    in response to determining that an optional area in a first type is already requested in a second type, generating, by one or more processors, code for outputting a bit indicating "1";
    in response to determining that the optional area in the first type is not present in the second type, generating, by one or more processors, code for outputting a bit indicating "0"; and
    in response to determining that the optional area in the first type is also an optional area in the second type, generating, by one or more processors, code for outputting a bit indicating "1" if a data value is present, and generating, by one or more processors, code for outputting a bit indicating "0" if no data value is present.

4. The method according to claim 1, wherein in a case of generating a serializer of a selection type in which a first type is selected from a plurality of types, specializing a serializer for each generation site comprises:
    in response to determining that a second type is a subtype of only the selected first type, generating, by one or more processors, code for outputting a numeric value; and
    generating, by one or more processors, code for serializing a data value, based on the second type and the selected first type.

5. A computer program product for generating at least one of a serializer and a deserializer for compiling a query, the computer program product comprising:
    one or more computer readable storage media and program instructions stored on the one or more computer readable storage media, the program instructions comprising:
    program instructions to infer a type of serialization for each generation site of compiling a query;
    program instructions to execute the inferred type of serialization, while transcribing identification information assigned to each generation site to a type as an annotation;
    program instructions to specialize a serializer for each generation site, based on the inferred type of serialization and a type of serialization that is actually used at a generation site;
    program instructions to recursively compare the inferred type of serialization and the type of serialization that is actually used at a generation site; and
    program instructions to serialize a data value using the specialized serializer for each generation site.

6. The computer program product according to claim 5, wherein in a case of generating a serializer of a record type having an optional area, the program instructions to specialize a serializer for each generation site, further comprise program instructions to:
    in response to determining that an optional area in a first type is already requested in a second type, generate code for outputting a first bit;
    in response to determining that the optional area in the first type is not present in the second type, generate code for outputting a second bit; and
    in response to determining that the optional area in the first type is also an optional area in the second type, generate code for outputting a first bit if a data value is present, and generating code for outputting a second bit if no data value is present.

7. The computer program product according to claim 5, wherein in a case of generating a serializer of a selection type in which a first type is selected from a plurality of types, the program instructions to specialize a serializer for each generation site, further comprise program instructions to:
    in response to determining that a second type is a subtype of only the selected first type, generating code for outputting a numeric value; and
    generating code for serializing a data value, based on the second type and the selected first type.

8. The computer program product of claim 5, wherein in a case of generating a serializer of a record type having an optional area, program instructions to specialize a serializer for each generation site comprise program instructions to:

in response to determining that an optional area in a first type is already requested in a second type, generate code for outputting a bit indicating "1";

in response to determining that the optional area in the first type is not present in the second type, generate code for outputting a bit indicating "0"; and in response to determining that the optional area in the first type is also an optional area in the second type, generate code for outputting a bit indicating "1" if a data value is present, and generate code for outputting a bit indicating "0" if no data value is present.

9. A computer system for generating at least one of a serializer and a deserializer for compiling a query, the computer system comprising:

one or more computer processors;

one or more computer readable storage media; and program instructions stored on the computer readable storage media for execution by at least one of the one or more processors, the program instructions comprising:

program instructions to infer a type of serialization for each generation site of compiling a query;

program instructions to execute the inferred type of serialization, while transcribing identification information assigned to each generation site to a type as an annotation;

program instructions to specialize a serializer for each generation site, based on the inferred type of serialization and a type of serialization that is actually used at a generation site;

program instructions to recursively compare the inferred type of serialization and the type of serialization that is actually used at a generation site; and program instructions to serialize a data value using the specialized serializer for each generation site.

10. The computer system of claim 9, wherein in a case of generating a serializer of a record type having an optional area, the program instructions to specialize a serializer for each generation site, further comprise program instructions to:

in response to determining that an optional area in a first type is already requested in a second type, generate code for outputting a first bit;

in response to determining that the optional area in the first type is not present in the second type, generate code for outputting a second bit; and in response to determining that the optional area in the first type is also an optional area in the second type, generate code for outputting a first bit if a data value is present, and generating code for outputting a second bit if no data value is present.

11. The computer system of claim 9, wherein in a case of generating a serializer of a selection type in which a first type is selected from a plurality of types, the program instructions to specialize a serializer for each generation site, further comprise program instructions to:

in response to determining that a second type is a subtype of only the selected first type, generating code for outputting a numeric value; and generating code for serializing a data value, based on the second type and the selected first type.

12. The computer system of claim 9, wherein in a case of generating a serializer of a record type having an optional area, program instructions to specialize a serializer for each generation site comprise program instructions to:

in response to determining that an optional area in a first type is already requested in a second type, generate code for outputting a bit indicating "1";

in response to determining that the optional area in the first type is not present in the second type, generate code for outputting a bit indicating "0"; and in response to determining that the optional area in the first type is also an optional area in the second type, generate code for outputting a bit indicating "1" if a data value is present, and generate code for outputting a bit indicating "0" if no data value is present.

* * * * *